(12) United States Patent
Jeon

(10) Patent No.: US 8,767,150 B2
(45) Date of Patent: Jul. 1, 2014

(54) LIQUID CRYSTAL DISPLAY AND METHOD OF MANUFACTURING THE SAME

(75) Inventor: Sang Jin Jeon, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 160 days.

(21) Appl. No.: 13/551,417

(22) Filed: Jul. 17, 2012

(65) Prior Publication Data

US 2013/0188116 A1 Jul. 25, 2013

(30) Foreign Application Priority Data

Jan. 20, 2012 (KR) ........................ 10-2012-0006980

(51) Int. Cl.
*G02F 1/1333* (2006.01)

(52) U.S. Cl.
USPC .............. 349/110; 349/43; 349/106; 349/139

(58) Field of Classification Search
CPC .............. H01L 29/786; H01L 29/7869; H01L 29/4908; H01L 29/78633; H01L 29/78693; H01L 29/41733; H01L 21/02112; H01L 21/02554; H01L 21/02565; H01L 21/02483; H01L 21/28; H01L 27/1288; H01L 27/3262; H01L 27/3248; H01L 27/3272; H01L 51/5203; H01L 31/02164; H01L 31/1136; H01L 27/14621; H01L 27/3244; H01L 51/5284; G02F 1/1368; G02F 1/133514; G02F 1/136209; G02F 1/136286; G02F 1/133; G02F 1/133345; G02F 1/134336; G02F 1/1362; G02F 1/136227; G02F 1/133512; G02F 2001/136222; G02F 2201/501; G02F 2001/136236; G02F 2001/133357; G02F 2202/10; G02F 2201/40; G02F 1/1333; G02F 1/133516; G02F 2201/50; G02F 2001/13613
USPC .............. 257/43, E31.122; 438/104; 349/43, 349/106, 46, 110, 139, 138, 140, 143, 146, 349/187, 141, 108; 345/87, 88
See application file for complete search history.

(56) References Cited

U.S. PATENT DOCUMENTS

| | | | |
|---|---|---|---|
| 7,994,508 B2 | 8/2011 | Ye | |
| 2010/0049510 A1 | 2/2010 | Zhan et al. | |
| 2010/0084651 A1 | 4/2010 | Yamazaki et al. | |
| 2010/0102313 A1 | 4/2010 | Miyairi et al. | |
| 2010/0117073 A1 | 5/2010 | Yamazaki et al. | |
| 2010/0117074 A1 | 5/2010 | Yamazaki et al. | |
| 2010/0200851 A1 | 8/2010 | Oikawa et al. | |
| 2012/0001179 A1* | 1/2012 | Yamazaki et al. | .............. 257/57 |

FOREIGN PATENT DOCUMENTS

| | | |
|---|---|---|
| KR | 100653466 | 11/2006 |
| KR | 1020080062647 A | 7/2008 |
| KR | 1020090006403 A | 1/2009 |
| KR | 1020100051544 A | 5/2010 |
| KR | 1020100123535 A | 11/2010 |
| KR | 1020110071040 A | 6/2011 |

OTHER PUBLICATIONS

Chuang, Chiao-Shun, et al., "P-13: Photosensitivity of Amorphous IGZO TFTs for Active-Matrix Flat-Panel Displays", SID 08 Digest, pp. 1215-1218.

* cited by examiner

*Primary Examiner* — Thoi Duong
(74) *Attorney, Agent, or Firm* — F. Chau & Associates, LLC

(57) ABSTRACT

A liquid crystal display according to an exemplary embodiment of the present invention includes a first substrate, a gate electrode formed on the first substrate, a gate insulating layer formed on the gate electrode, a semiconductor formed on the gate insulating layer, a source electrode and a drain electrode formed on the semiconductor, a second substrate that faces the first substrate, and a light blocking member formed on the second substrate, and the semiconductor includes a metal oxide semiconductor and the light blocking member is not formed in a region corresponding to at least a portion of the semiconductor.

30 Claims, 23 Drawing Sheets

FIG.3
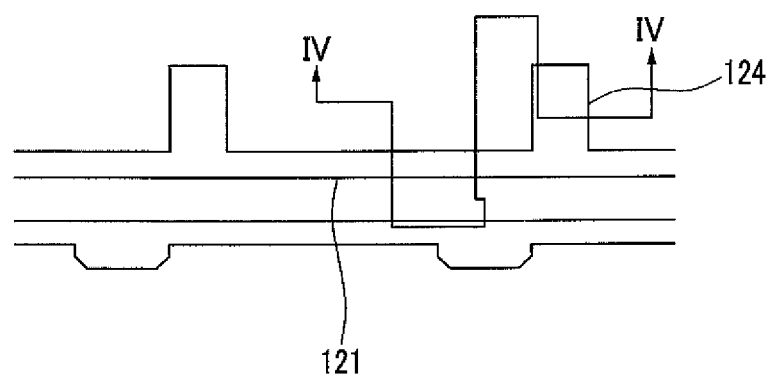

FIG.15
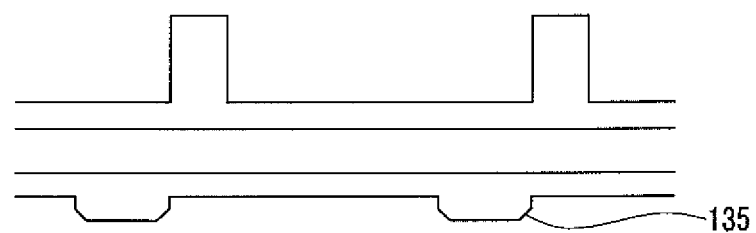
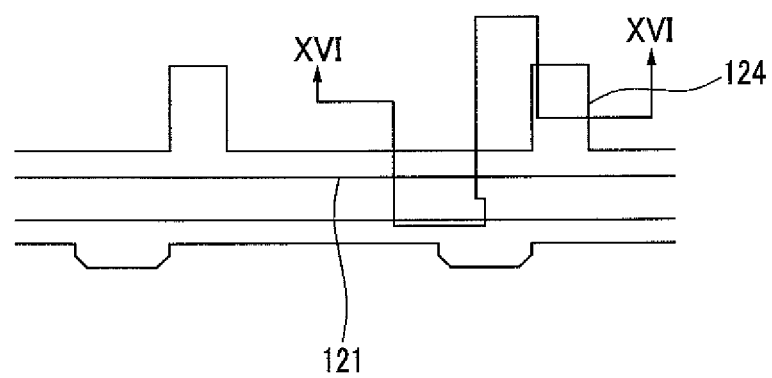

US 8,767,150 B2

LIQUID CRYSTAL DISPLAY AND METHOD OF MANUFACTURING THE SAME

CROSS-REFERENCE TO RELATED APPLICATION

This application claims priority to and the benefit of Korean Patent Application No. 10-2012-0006980 filed in the Korean Intellectual Property Office on Jan. 20, 2012, the entire contents of which are incorporated herein by reference.

TECHNICAL FIELD

Embodiments of the present invention relate to a liquid crystal display and a method of manufacturing the liquid crystal display.

DISCUSSION OF THE RELATED ART

A liquid crystal display controls the amount of light passing through a liquid crystal layer by applying a voltage to electrodes to create an electric field in the liquid crystal layer to realign liquid crystal molecules of the liquid crystal layer.

The liquid crystal display is not a self-emitting display device and thus uses a light emitting element, such as a backlight device, to generate light. Visibility of a liquid crystal display may be increased by increasing an aperture ratio of the liquid crystal display.

SUMMARY

Embodiments of the present invention provide a liquid crystal display and a method of manufacturing the liquid crystal display that can increase an aperture ratio of the liquid crystal display.

An exemplary embodiment of the present invention provides a liquid crystal display including a first substrate, a gate electrode formed on the first substrate, a gate insulating layer formed on the gate electrode, a semiconductor formed on the gate insulating layer, a source electrode and a drain electrode formed on the semiconductor, a second substrate that faces the first substrate, and a light blocking member formed on the second substrate. Here, the semiconductor includes a metal oxide semiconductor, and the light blocking member is not formed in a region corresponding to at least a portion of the semiconductor.

A width of the gate electrode may be smaller than a width of the semiconductor.

The liquid crystal display may further include a pixel electrode formed directly on a portion of the drain electrode.

The liquid crystal display may further include a passivation layer formed on the pixel electrode, and a reference electrode formed on the passivation layer.

The passivation layer may include a color filter.

The liquid crystal display may further include a common electrode disposed on the second substrate.

The liquid crystal display may further include a color filter disposed on the second substrate.

The liquid crystal display may further include a pixel electrode formed of the same layer as the drain electrode.

An exemplary embodiment of the present invention provides a method of manufacturing a liquid crystal display, the method including forming a gate electrode on a first substrate, forming a gate insulating layer on the gate electrode, forming a semiconductor including a metal oxide semiconductor on the gate insulating layer, forming a source electrode and a drain electrode on the semiconductor, and forming a light blocking member on a second substrate that faces the first substrate, and the light blocking member is not formed in a region corresponding to at least a portion of the semiconductor.

A width of the gate electrode may be smaller than a width of the semiconductor.

A pixel electrode may be formed directly on a portion of the drain electrode.

The method may further include forming a passivation layer on the pixel electrode and forming a reference electrode on the passivation layer.

Forming of the passivation layer may include forming a color filter.

The method may further include forming a common electrode on the second substrate.

The method may further include forming a color filter on the second substrate.

The pixel electrode may be formed of the same layer as the drain electrode together with the drain electrode.

According to exemplary embodiments of the present invention, the liquid crystal display uses as a channel region of the thin film transistor a metal oxide semiconductor that is not affected by the leakage current caused by light having a visible light wavelength range. The light blocking member is removed from a portion corresponding to the semiconductor layer. Therefore, light can pass through the portion corresponding to the semiconductor layer without a decrease in performance of the thin film transistor, resulting in an increase in the aperture ratio of the liquid crystal display.

BRIEF DESCRIPTION OF THE DRAWINGS

FIG. 3, FIG. 5, FIG. 7 and FIG. 9 are layout views sequentially illustrating a method of manufacturing a liquid crystal display according to an exemplary embodiment of the present invention.

FIG. 15, FIG. 17, and FIG. 19 are layout views sequentially illustrating a method of manufacturing a liquid crystal display according to an exemplary embodiment of the present invention.

DETAILED DESCRIPTION OF THE EMBODIMENTS

Figure 1:
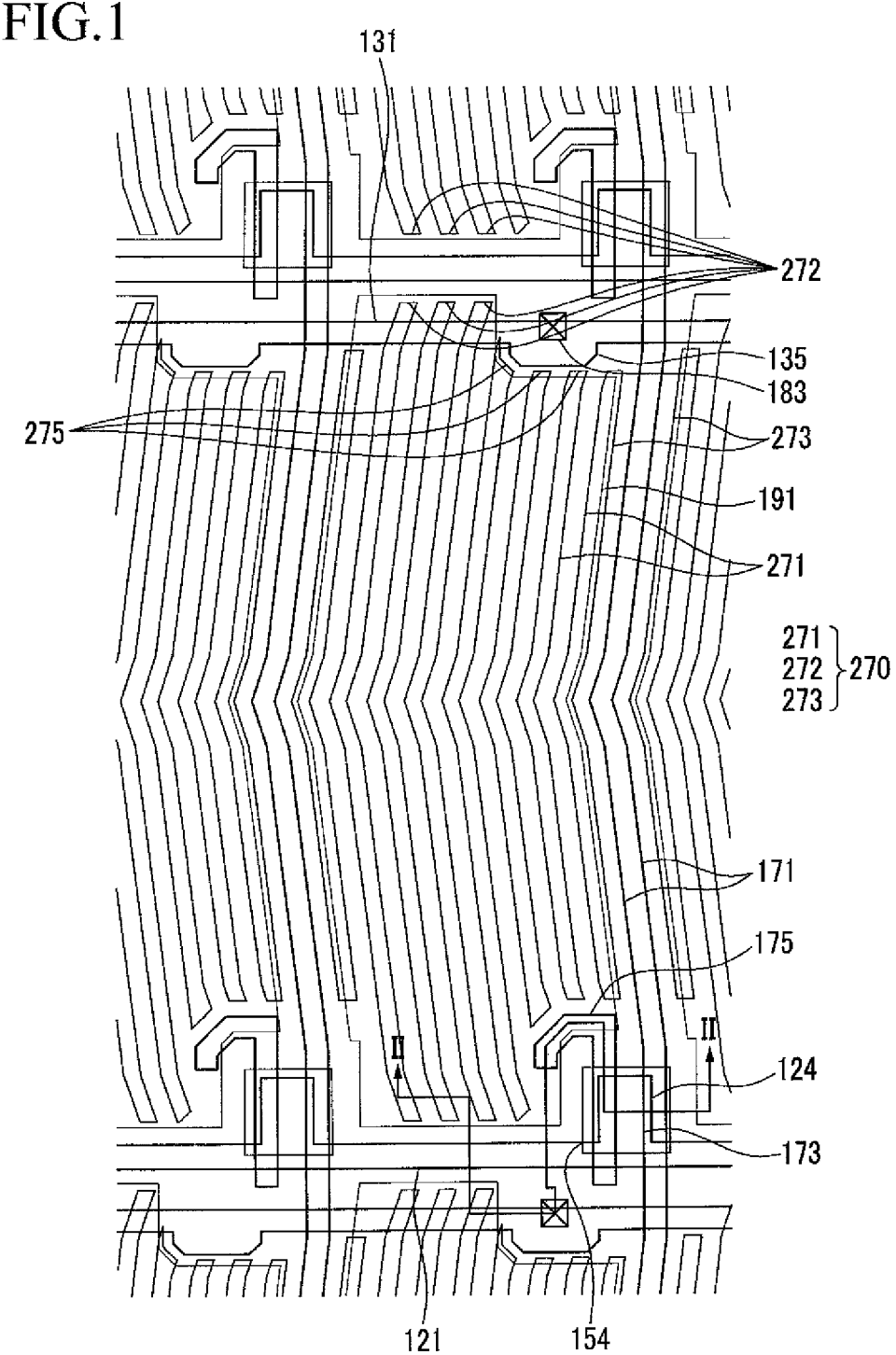
FIG. 1 is a layout view illustrating a liquid crystal display according to an exemplary embodiment of the present invention.

The embodiments of the present invention will be described in detail hereinafter with reference to the accompanying drawings. The described embodiments may be modified in various different ways, all without departing from the spirit or scope of the present invention.

In the drawings, the thickness of layers, films, panels, regions, etc., may be exaggerated for clarity. Like reference numerals may designate like or similar elements throughout the specification and the drawings. It will be understood that when an element such as a layer, film, region, or substrate is referred to as being "on" another element, it can be directly on the other element or intervening elements may also be present.

Figure 2:
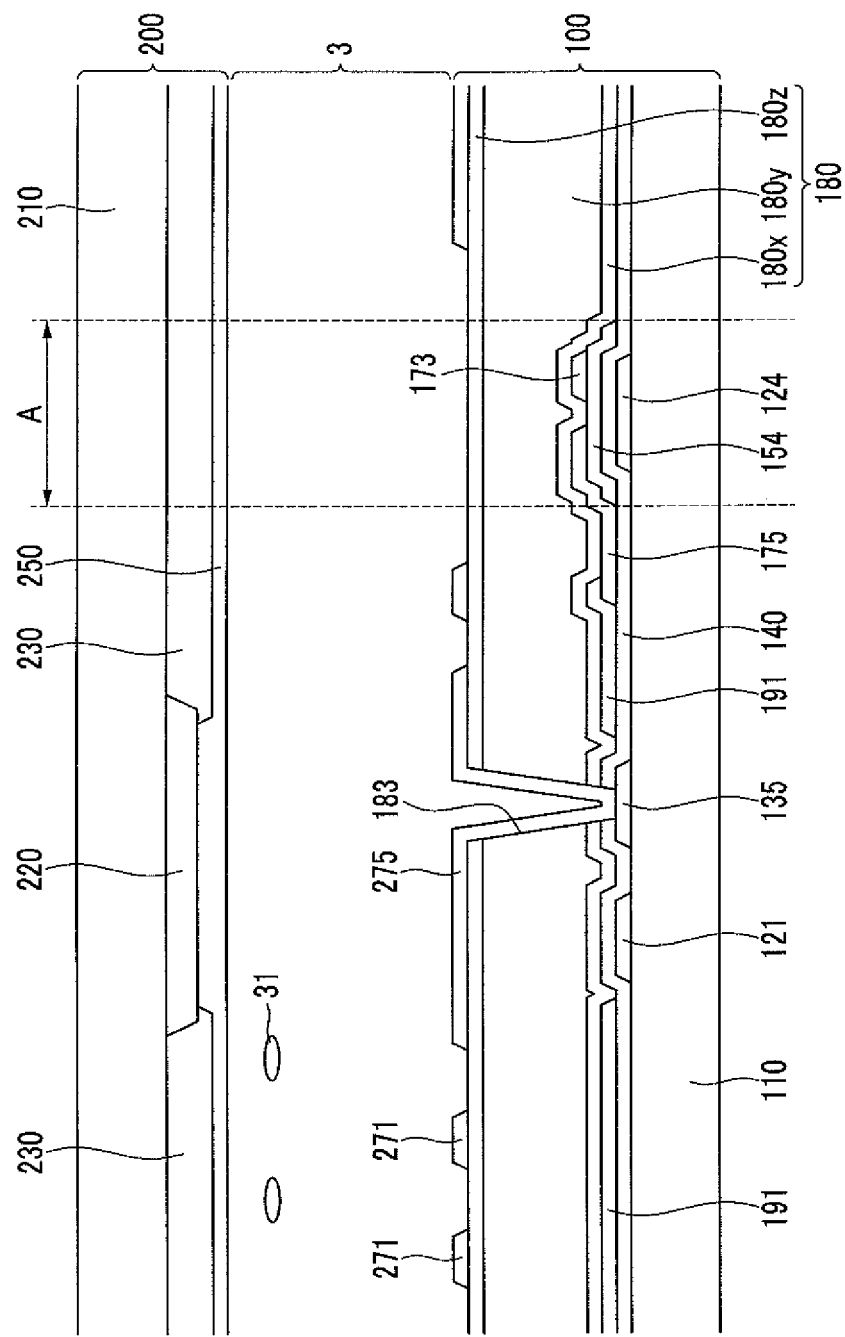
FIG. 2 is a cross-sectional view taken along line of FIG. 1.

FIG. 1 is a layout view illustrating a liquid crystal display according to an exemplary embodiment of the present invention, and FIG. 2 is a cross-sectional view taken along line of FIG. 1.

Referring to FIG. 1 and FIG. 2, the liquid crystal display according to an exemplary embodiment of the present invention includes a lower panel 100 and an upper panel 200 which face each other. A liquid crystal layer 3 is disposed between the lower and upper panels 100 and 200.

Gate conductors including a gate line 121 and a reference voltage line 131 are formed on a first insulation substrate 110 made of transparent glass or plastic. The gate line 121 includes a gate pad (not shown) for connection with a gate electrode 124 and other layers or an external driving circuit.

The gate line 121 may be formed of aluminum-based metal, such as aluminum (Al) or an aluminum alloy, sliver-based metal, such as silver (Ag) or a silver alloy, copper-based metal, such as copper (Cu) or a copper alloy, molybdenum-based metal, such as molybdenum (Mo) or a molybdenum alloy, chromium (Cr), tantalum (Ta), and titanium (Ti). However, the gate line 121 may have a multilayered structure having at least two conductive layers having different physical properties.

The reference voltage line 131 transmits a predetermined reference voltage and includes an extension portion 135 for connection with a reference electrode 270. The reference voltage line 131 is connected to the reference electrode 270 and transmits the reference voltage to the reference electrode 270. The reference voltage line 131 is parallel to the gate line 121 and formed of the same material as the gate line 121.

A gate insulating layer 140 is formed of silicon nitride (SiNx) or silicon oxide (SiOx) on the gate conductors 121 and 131. The gate insulating layer 140 may have a multilayered structure including at least two conductive layers each having a different physical property.

A metal oxide semiconductor, for example, a semiconductor 154 including IGZO (In—Ga—Zn—O), is formed on the gate insulating layer 140. The semiconductor 154 may overlap at least a portion of the gate electrode 124 and be formed to be wider than the gate electrode 124.

Data conductors including a data line 171 and a drain electrode 175 are formed on the gate insulating layer 140 and the semiconductor 154. The data line 171 includes a source electrode 173.

The data line 171 includes a wide end portion (not shown) for connection with other layers or an external driving circuit. The data line 171 transfers a data signal and mainly extends in a vertical direction and intersects the gate line 121 and the reference voltage line 131. The data line 171 and the gate line 121 form a pixel area. According to an embodiment, the data line 171 may include a first curved portion to obtain a maximum transmittance of the liquid crystal display. At the center region of the pixel area, the data line 171 may further include a second curved portion which forms a predetermined angle with the first curved portion. The curved portions, for example, two adjacent second curved portions, meet at the center region of the pixel area to form a V shape.

The first curved portion of the data line 171 may be bent approximately at 7° with respect to a rubbing direction of an alignment layer. The second curved portion may be further bent to form an angle of approximately 7° to approximately 15° with the first curved portion.

The source electrode 173 is a portion of the data line 171 and disposed on the same line as the data line 171. The drain electrode 175 is formed to be parallel to the source electrode 173. Accordingly, the drain electrode 175 is parallel to a portion of the data line 171. Further, an extension portion of the drain electrode is formed to be spaced apart from a plurality of branch electrodes 271 of the reference electrode 270. An edge of the extension portion of the drain electrode 175 may be parallel to at least a portion of an edge of a horizontal connecting portion 272 that connects the plurality of branch electrodes 271. The extension portion of the drain electrode 175 is formed not to overlap the branch electrodes 271 of the reference electrode 270. Therefore, the drain electrode 175 does not cover the liquid crystal layer that is affected by an electric field so that reduction in the aperture ratio can be prevented.

The gate electrode 124, the source electrode 173, and the drain electrode 175 form a thin film transistor (TFT) together with the semiconductor 154. The channel of the thin film transistor is formed in the semiconductor 154 between the source electrode 173 and the drain electrode 175.

According to an exemplary embodiment of the present invention, the channel of the thin film transistor includes a transparent metal oxide semiconductor layer so that light transmits the gate electrode 124 and the semiconductor layer 154 that is not covered by a data metal layer. Therefore, the aperture ratio of the liquid crystal display can be increased.

Further, the liquid crystal display according to an exemplary embodiment of the present invention includes a source electrode 173 disposed on the same line as the data line 171 and a drain electrode 175 extending parallel with the data line 171. Therefore, a width of the thin film transistor may be increased without an increase in an area occupied by the data conductors 171 and 175, resulting in an increase in the aperture ratio of the liquid crystal display.

The data line 171 and the drain electrode 175 may include refractory metal, such as molybdenum, chromium, tantalum, and titanium, and a low resistance conductor, such as copper. According to an embodiment, the data line 171 and the drain electrode 175 may include titanium and copper.

A barrier layer that prevents a reaction between the oxide semiconductor layer and the data metal layer or diffusion of some components of the oxide semiconductor layer may be further included between the semiconductor layer 154 including the oxide semiconductor layer and the data line 171 and the drain electrode 175. For example, according to an embodiment, the barrier layer may include a zinc gallium oxide (GZO).

A pixel electrode 191 is formed on a portion of the drain electrode 175 and the gate insulating layer 140.

The pixel electrode 191 includes two curved edges that are substantially parallel to the first curved portion and the second curved portion of the data line 171.

The pixel electrode 191 covers a portion of the drain electrode 175 so as to be disposed on the drain electrode 175 and is physically and electrically connected to the drain electrode 175 through a direct connection.

The pixel electrode 191 may be formed of a transparent conductive material, such as a polycrystalline, single crystalline or amorphous indium tin oxide (ITO), or indium zinc oxide (IZO).

A first passivation layer 180x is formed on the data conductors 171 and 175, the exposed semiconductor 154, and the pixel electrode 191. The first passivation layer 180x may be formed of an organic insulating material or an inorganic insulating material. According to an embodiment, the first passivation layer 180x may include a lower layer and an upper layer. When the data conductors 171 and 175 include copper, the lower layer of the first passivation layer 180x includes silicon oxide (SiOx) and the upper layer includes silicon nitride (SiNx).

A second passivation layer 180y is formed on the first passivation layer 180x. The second passivation layer 180y includes an organic material. According to an embodiment, the second passivation layer 180y may be a color filter. When the second passivation layer 180y is a color filter, the second passivation layer 180y displays at least one of the primary colors, e.g., red, green, or blue.

A third passivation layer 180z is formed on the second passivation layer 180y. The third passivation layer 180z may be formed of an organic insulating material or an inorganic insulating material. When the second passivation layer 180y includes a color filter, the third passivation layer 180z prevents the material of the color filter from being diffused. When the second passivation layer 180y does not include a color filter, the third passivation layer 180z may be omitted.

According to an embodiment, a contact hole (not shown) that exposes an end portion of the data line 171 is formed in the passivation layers 180. According to an embodiment, a contact hole 183 that exposes the extension portion 135 of the reference voltage line 131 and a contact hole (not shown) that exposes the end portion of the gate line 121 are formed in the passivation layers 180 and the gate insulating layer 140.

The reference electrode 270 is formed on the passivation layers 180. The reference electrode 270 overlaps the pixel electrode 191 and includes the plurality of branch electrodes 271, a horizontal connecting portion 272 that connects the plurality of branch electrodes 271 to one another, and a vertical connecting portion 273 that connects to the horizontal connecting portion 272. The reference electrode 270 may be formed of a transparent conductive material, such as a polycrystalline, single crystalline or amorphous indium tin oxide (ITO), or indium zinc oxide (IZO). The reference electrodes 270 disposed in adjacent pixels are connected to each other.

The horizontal connecting portion 272 of the reference electrode 270 includes a reference electrode extension portion 275 that extends toward the extension portion 135 of the reference voltage line 131.

The extension portion 275 of the reference electrode 270 is physically and electrically connected to the reference voltage line 131 through the contact hole 183 formed in the passivation layers 180 and the gate insulating layer 140.

According to an embodiment, an alignment layer is formed on the reference electrode 270 and the passivation layers 180. The alignment layer may be a horizontal alignment layer and is rubbed in a predetermined direction. A rubbing direction of the alignment layer forms approximately an angle of 5° to approximately 10° with an extending direction of the branch electrodes of the reference electrode 270, and more specifically an angle of approximately 7°.

According to an embodiment, since the pixel electrode 191 of the liquid crystal display contacts the drain electrode 175 directly on the drain electrode 175, the first passivation layer 180x and the second passivation layer 180y are disposed between the pixel electrode 191 and the reference electrode 270. Accordingly, the first passivation layer 180x and the second passivation layer 180y are patterned using a single mask. When the second passivation layer 180y includes a color filter, a color filter and the second passivation layer 180y can be disposed at a desired position using a halftone mask simultaneously with the formation of the contact hole 183 in the first passivation layer 180x.

A data voltage is applied to the pixel electrode 191 from the drain electrode 175, and a predetermined level of a reference voltage is applied to the reference electrode 270 from the reference voltage line 131. The reference electrodes 270 are connected to each other, and the reference voltage is applied to the reference electrodes 270 from a reference voltage applying unit that is disposed outside the display area. The same level of reference voltage is applied to the reference electrodes 270 from a reference voltage line 131 to prevent the voltage from being dropped in the display area.

A light blocking member 220 is formed on a second insulation substrate 210 made of transparent glass or plastic. The light blocking member 220 is also referred to as a black matrix and prevents light leakage.

The light blocking member 220 is formed in a non-opening region of the liquid crystal display. Specifically, the light blocking member 220 is formed at a position corresponding to a portion where the gate conductors (e.g., a gate line) and the data conductors (e.g., a data line and a drain electrode) are disposed and at a portion where a thin film transistor is formed. The gate and data conductors are formed of an opaque conductor. However, in the liquid crystal display according to an exemplary embodiment of the present invention, the channel of the thin film transistor is formed of a semiconductor 154 including a metal oxide semiconductor layer so that no leakage current is caused by light in the thin film transistor. Accordingly, in a region A corresponding to the thin film transistor, the light blocking member 220 is not formed. Thus, light penetrates a portion of the semiconductor 154 forming the channel of the thin film transistor that is not covered by the opaque gate electrode 124, the source electrode 173 and the drain electrode 175. Therefore, the aperture ratio of the liquid crystal display can be increased.

A color filter 230 is formed on the light blocking member 220 and the second insulation substrate 210. However, according to an embodiment, when the second passivation layer 180y of the lower panel 100 includes a color filter, the color filter 230 is omitted. An overcoat 250 is formed on the light blocking member 220 and the color filter 230.

The liquid crystal layer 3 includes a nematic liquid crystal material having a positive dielectric anisotropy. The liquid crystal molecules of the liquid crystal layer 3 are aligned so that a major axis direction is parallel to the panels 100 and 200. Further, the aligning direction of the liquid crystal molecules is spirally twisted at 90° from a rubbing direction of the alignment layer of the lower panel 100 to the upper panel 200.

The pixel electrode 191 to which a data voltage is applied and the reference electrode 270 to which a reference voltage is applied generate an electric field so that the liquid crystal molecules of the liquid crystal layer 3 disposed on the two electrodes 191 and 270 rotate in a direction parallel to the direction of the electric field. The polarization of light that passes through the liquid crystal layer is changed depending on a rotation direction of the liquid crystal molecules determined as described above.

The liquid crystal molecules 31 of the liquid crystal layer 3 of the liquid crystal display are rotated by the electric field formed between sides of the branch electrodes of the pixel electrode 191 and the reference electrode 271. According to an embodiment, in the liquid crystal display, the alignment layer is rubbed such that the liquid crystal molecules 31 of the liquid crystal layer 3 are pre-tilted at a predetermined angle. According to an embodiment, a rubbing angle is approximately 7° with respect to a branch portion of the pixel electrode 191 so that the liquid crystal molecules 31 rapidly rotate in the pre-tilted direction.

In the liquid crystal display according to an exemplary embodiment of the present invention forms, a channel of the thin film transistor includes a transparent metal oxide semiconductor layer so that light penetrates the gate electrode 124 and the semiconductor layer 154 that is not covered with a data metal layer. Therefore, the aperture ratio of the liquid crystal display can be increased.

The pixel electrode 191 of the liquid crystal display according to an exemplary embodiment of the present invention is disposed between the gate insulating layer 140 and the passivation layers 180 and covers a portion of the drain electrode 175 to be directly physically and electrically connected thereto. Therefore, the aperture ratio is increased as compared with a liquid crystal display in the related art in which the pixel electrode 191 is connected to the drain electrode 175 through a contact hole.

Further, the liquid crystal display according to an exemplary embodiment of the present invention includes a source electrode 173 disposed on the same line as the data line 171 and a drain electrode 175 extending parallel with a portion of the data line 171. Therefore, a width of the thin film transistor can be increased without an increase in an area occupied by the data conductors, resulting in an increase in the aperture ratio of the liquid crystal display.

Next, referring to FIG. 3 to FIG. 11 together with FIG. 1 and FIG. 2, a method of manufacturing a liquid crystal display according to an exemplary embodiment of the present invention is described.

Figure 4:
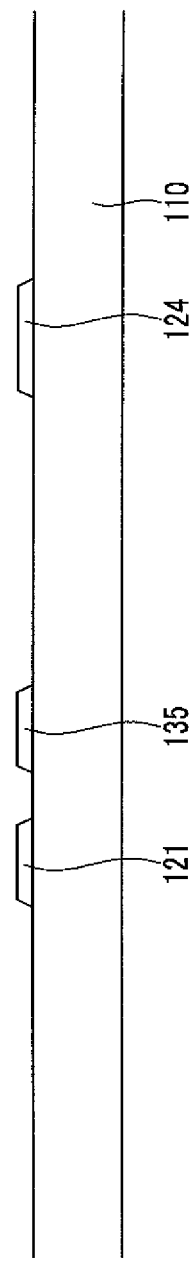
FIG. 4 is a cross-sectional view taken along line IV-IV of FIG. 3.
Figure 5:
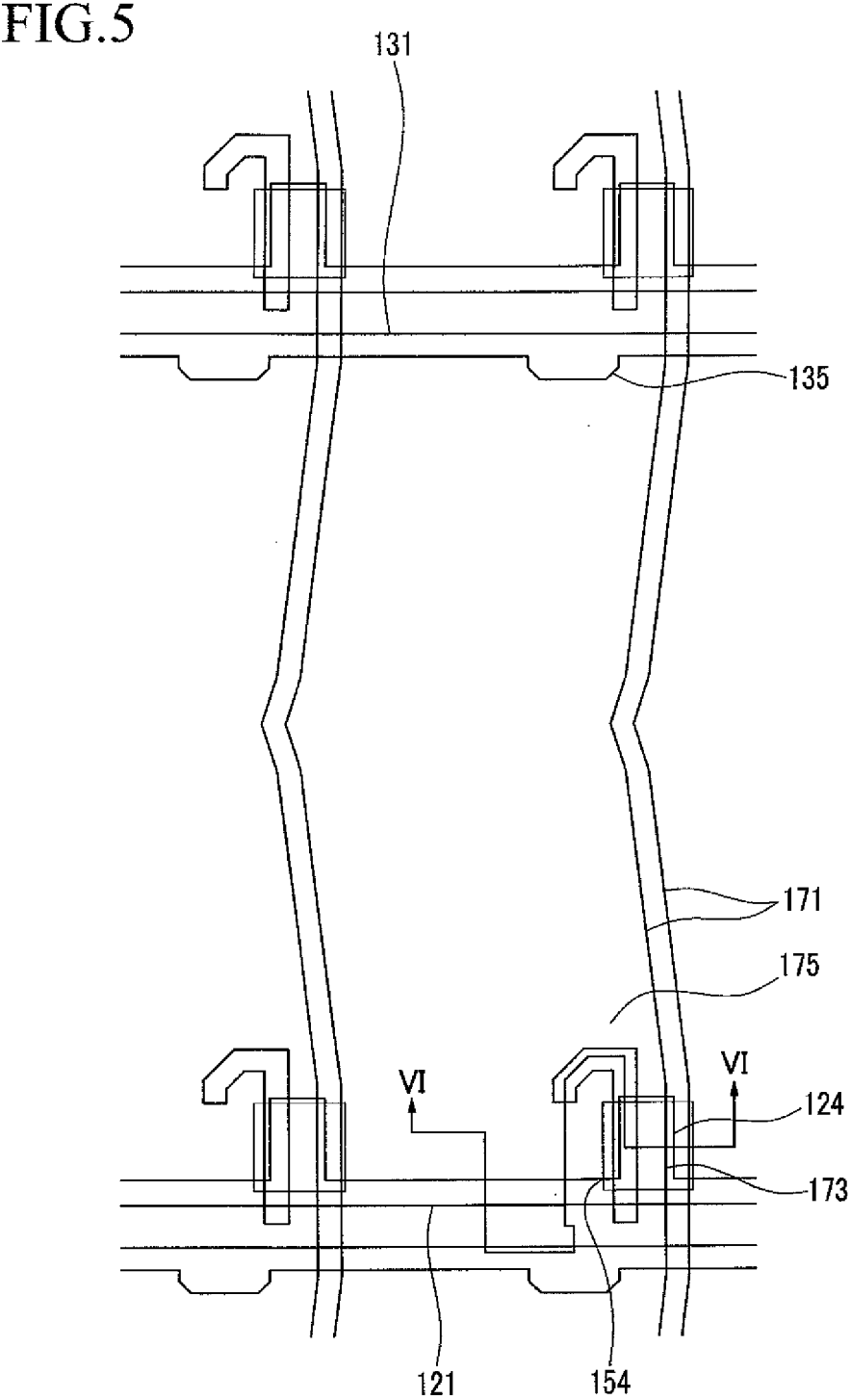
Figure 6:
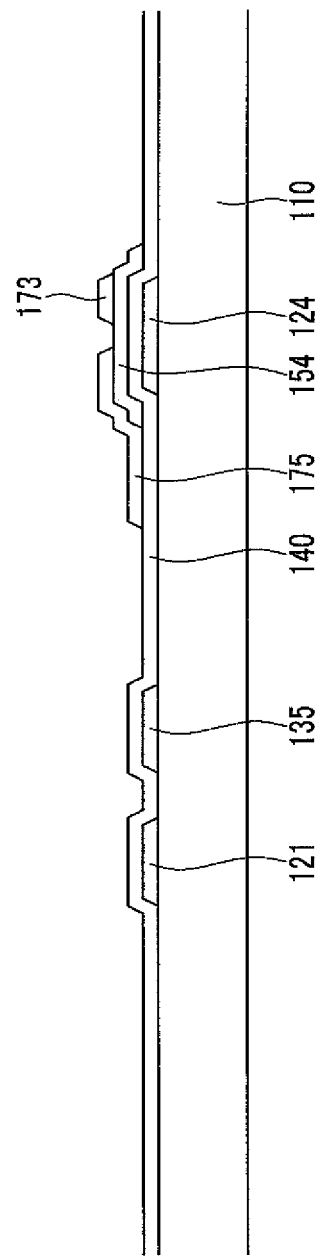
FIG. 6 is a cross-sectional view taken along line VI-VI of FIG. 5.
Figure 7:
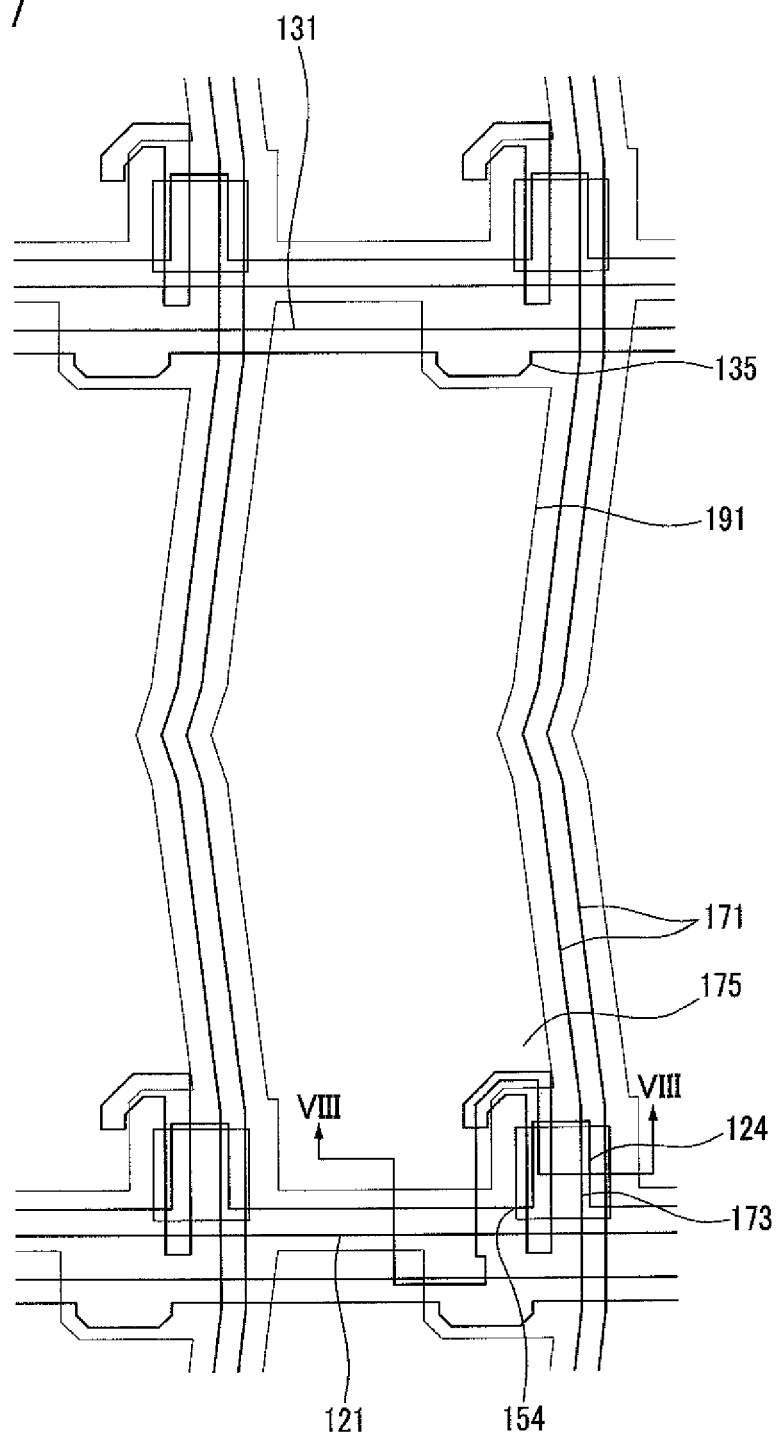
Figure 8:
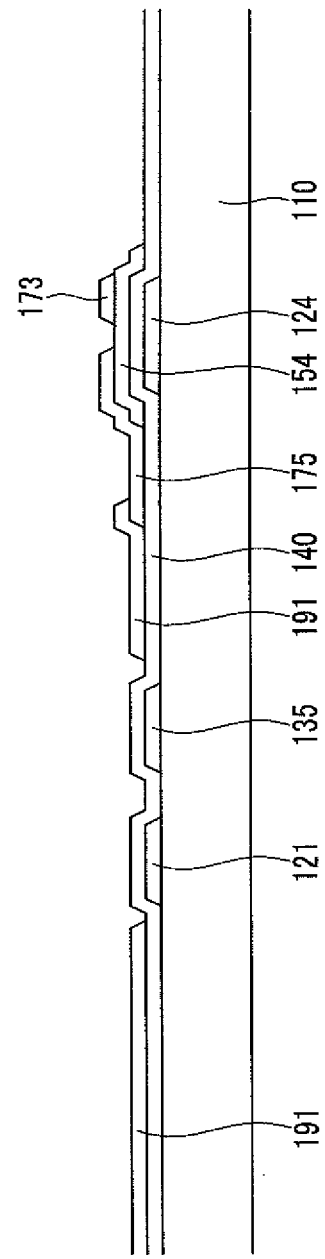
FIG. 8 is a cross-sectional view taken along line VIII-VIII of FIG. 7.
Figure 9:
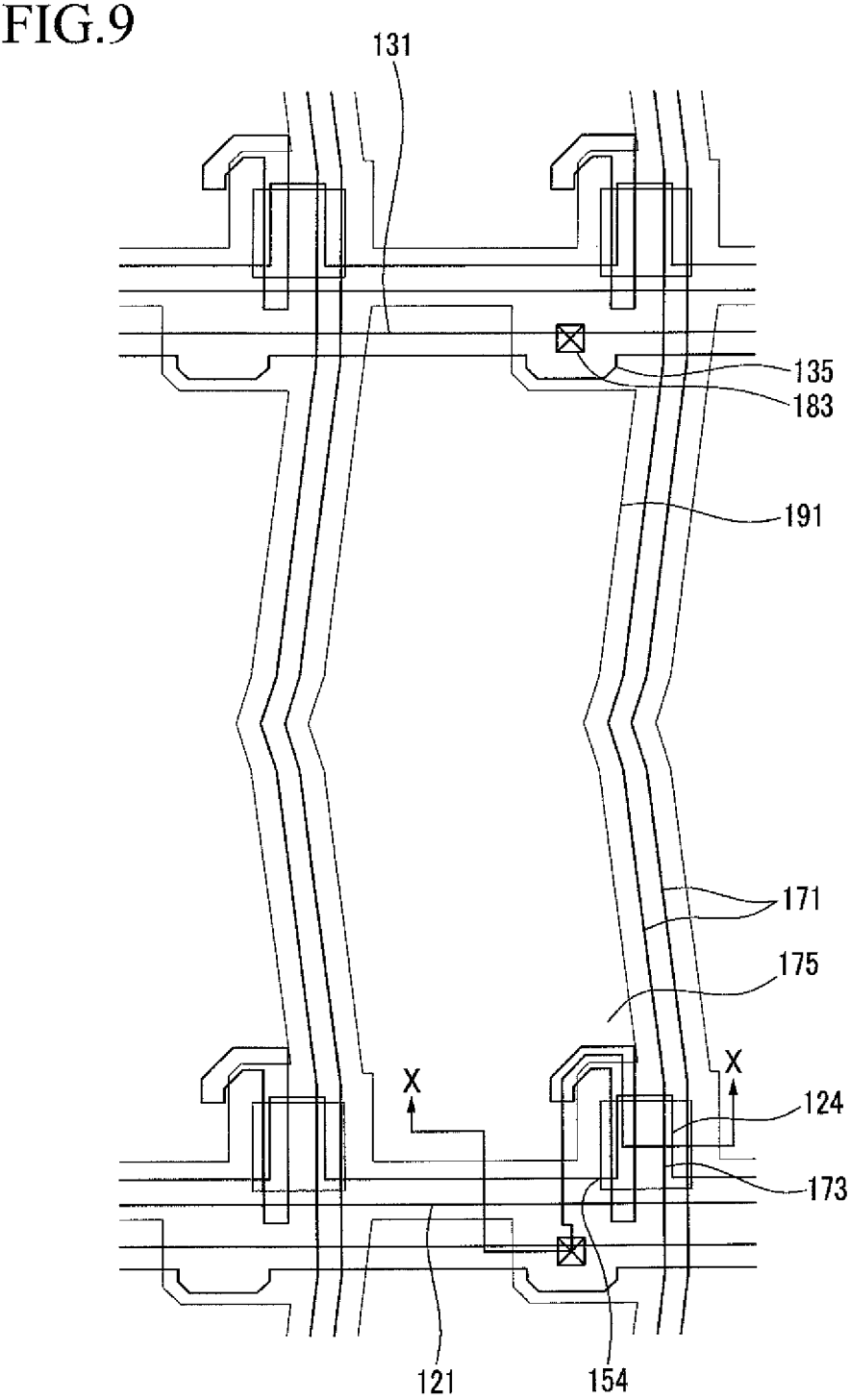
Figure 10:
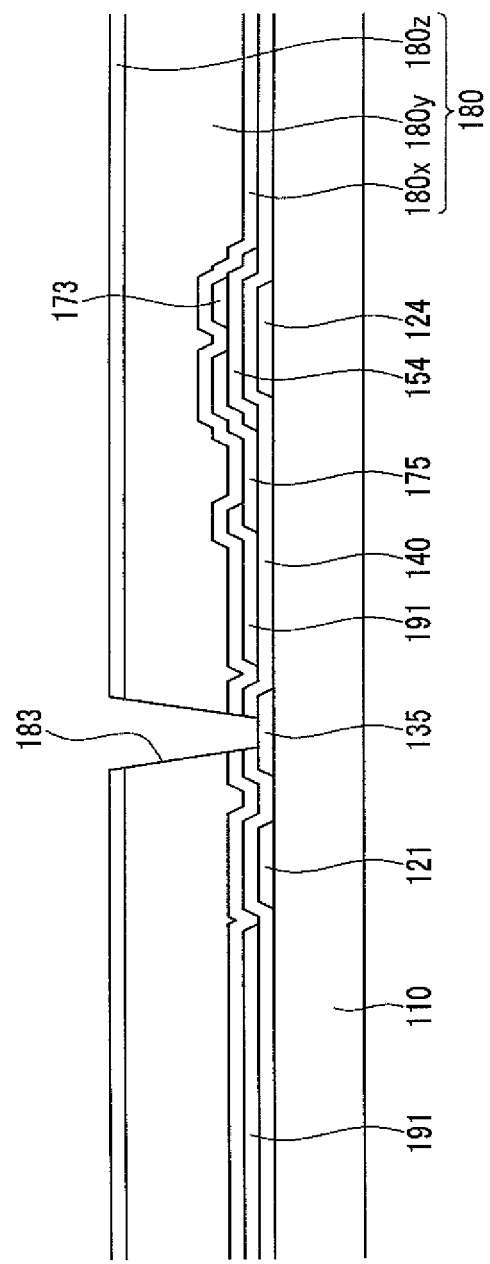
FIG. 10 is a cross-sectional view taken along line X-X of FIG. 9.
Figure 11:
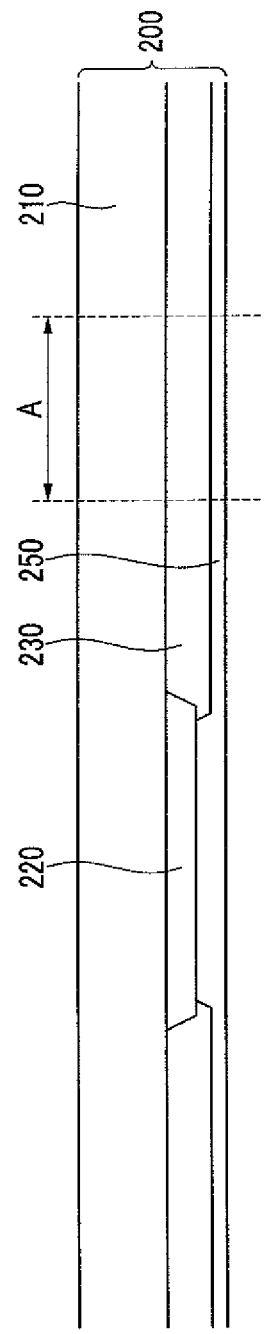
FIG. 11 is a cross-sectional view illustrating a method of manufacturing a liquid crystal display according to an exemplary embodiment of the present invention.

FIG. 3, FIG. 5, FIG. 7 and FIG. 9 are layout views sequentially illustrating a method of manufacturing a liquid crystal display according to an exemplary embodiment of the present invention, FIG. 4 is a cross-sectional view taken along line IV-IV of FIG. 3, FIG. 6 is a cross-sectional view taken along line VI-VI of FIG. 5, FIG. 8 is a cross-sectional view taken along line VIII-VIII of FIG. 7, FIG. 10 is a cross-sectional view taken along line X-X of FIG. 9, and FIG. 11 is a cross-sectional view illustrating a method of manufacturing a liquid crystal display according to an exemplary embodiment of the present invention.

Referring to FIG. 3 and FIG. 4, gate conductors including a gate line 121 including a gate electrode 124 and a reference voltage line 131 are formed on a first insulation substrate 110.

The gate conductors are formed by laminating metal layers, such as aluminum-based metal, such as aluminum (Al) or an aluminum alloy, silver-base metal, such as silver (Ag) or a silver alloy, copper-based metal, such as copper (Cu) or a copper alloy, molybdenum-based metal, such as molybdenum (Mo) or a molybdenum alloy, chromium (Cr), tantalum (Ta), and titanium (Ti), and then performing photolithography on the laminated metal layers.

Next, referring to FIG. 5 and FIG. 6, a gate insulating layer 140 is disposed on the gate conductors 121 and 131, and a semiconductor layer 154 including a metal oxide semiconductor and data conductors that include a data line 171 including a source electrode 173 and a drain electrode 175 are formed on the gate insulating layer 140. The data line 171 includes a first curved portion to obtain a maximum transmittance of the liquid crystal display. At the center region of the pixel area, the data line 171 further includes a second curved portion which is bent to form a predetermined angle with the first curved portion. Second curved portions meet at the center region of the pixel area to form a V shape.

Since the semiconductor layer 154 includes a metal oxide semiconductor, no leakage current is caused by light. Therefore, in a region corresponding to the semiconductor layer 154, as shown in FIG. 2, a light blocking member 220 is not disposed.

The source electrode 173 is disposed on the same line as the data line 171, and the drain electrode 175 extends parallel to the data line 171. Therefore, without an increase in an area occupied by the data conductors, a width of the thin film transistor can be increased, resulting in an increase in the aperture ratio of the liquid crystal display. The data line 171 and the drain electrode 175 may include refractory metal, such as molybdenum, chromium, tantalum and titanium, and a low resistance conductor, such as copper. Specifically, according to an embodiment, the data line 171 and the drain electrode 175 may include titanium and copper.

Referring to FIG. 7 and FIG. 8, the pixel electrode 191 is formed on a portion of the drain electrode 175 and the gate insulating layer 140. The pixel electrode 191 is formed by laminating a transparent conductive material, such as a polycrystalline, single crystalline or amorphous indium tin oxide (ITO), or indium zinc oxide (IZO), and performing photolithography on the laminated transparent conductive material. The pixel electrode 191 is formed directly on the drain electrode 175 including refractory metal, such as titanium and copper, and directly contacts the drain electrode 175.

Thereafter, referring to FIG. 9 and FIG. 10, passivation layers 180 are formed on the data line 171, the drain electrode 175, the pixel electrode 191 and an exposed portion of the semiconductor 154. The passivation layers 180 include a first passivation layer 180x formed of an organic insulating material or an inorganic insulating material and a second passivation layer 180y including an organic material. According to an embodiment, the second passivation layer 180y may be a color filter. When the second passivation layer 180y is a color filter, the passivation layers 180 include a third passivation layer 180z. The passivation layers 180 including a plurality of layers may be formed using a single mask. The mask is, for example, a halftone mask.

Next, as shown in FIG. 1 and FIG. 2, a reference electrode 270 is formed on the passivation layers 180. The reference electrode 270 is formed of a transparent conductive material, such as a polycrystalline, single crystalline or amorphous indium tin oxide (ITO), or indium zinc oxide (IZO), and is physically and electrically connected to the reference voltage line 131 through a contact hole 183 formed in the passivation layers 180 and the gate insulating layer 140.

As shown in FIG. 11, a light blocking member 220 is disposed in a region on the second insulation substrate 210 corresponding to the gate conductors and the data conductors.

The light blocking member 220 is not formed in a region A corresponding to the thin film transistor, thus completing the upper panel 200.

Next, the lower panel 100 and the upper panel 200 are aligned and attached to face each other and the liquid crystal layer 3 is formed between the panels 100 and 200. Alternatively, the liquid crystal layer 3 may be formed, e.g., by dripping liquid crystal, on one of the lower panel 100 and the upper panel 200, and then the two panels 100 and 200 are aligned and attached.

Figure 12:
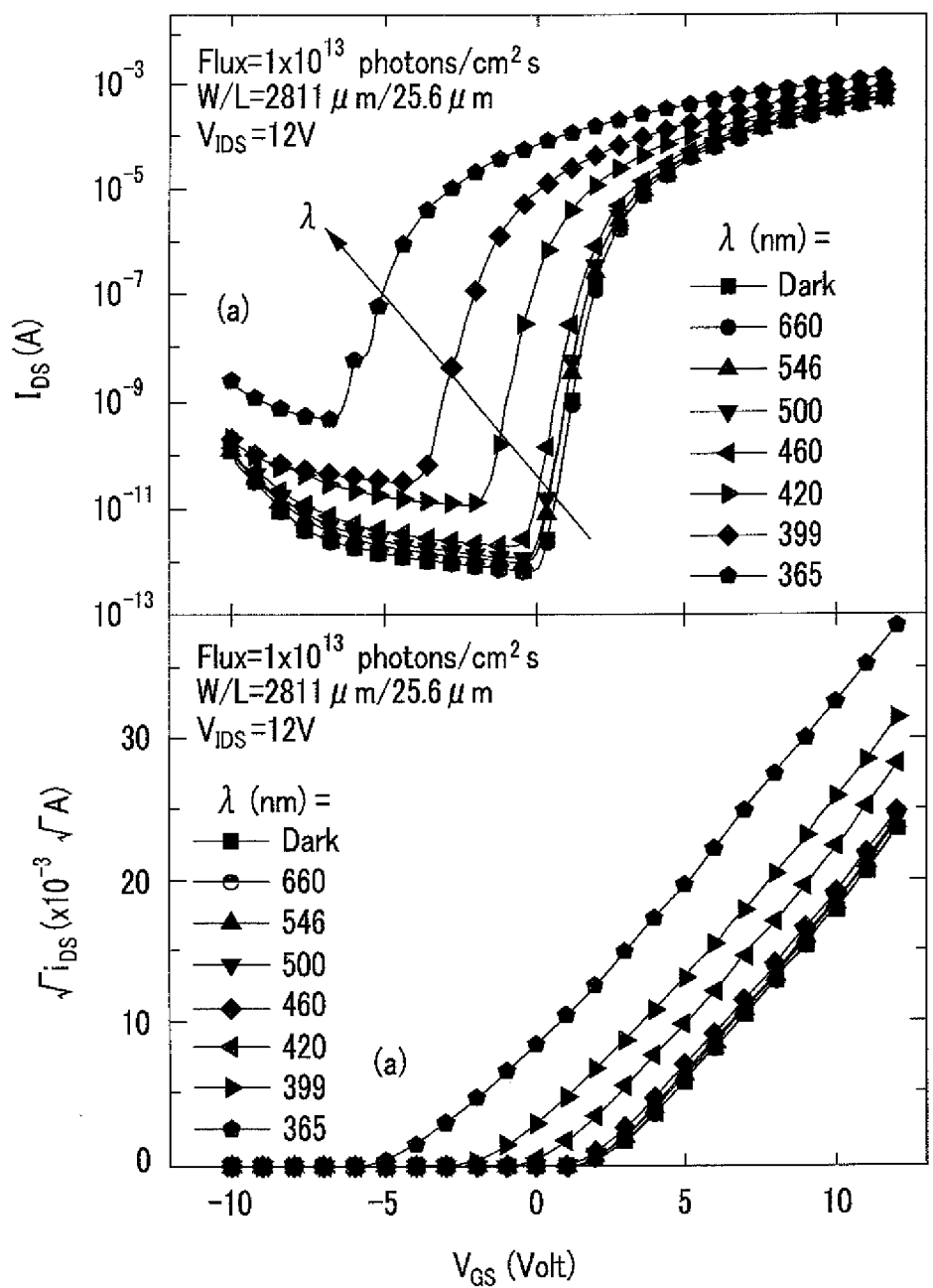
FIG. 12 is a graph illustrating a voltage-current of a thin film transistor of a liquid crystal display according to an experimental example of an embodiment of the present invention.

Referring to FIG. 12, a performance of a thin film transistor of a liquid crystal display is described. FIG. 12 is a graph illustrating a voltage-current characteristic of a thin film transistor of a liquid crystal display according to an embodiment of the present invention.

According to an embodiment, after a channel layer of the thin film transistor is formed of a metal oxide semiconductor, light is irradiated onto the thin film transistor while changing a wavelength of the light. Thereafter, a voltage-current characteristic is measured and represented in a graph.

Referring to FIG. 12, when a channel layer is formed of the metal oxide semiconductor like the thin film transistor of the liquid crystal display according to an exemplary embodiment of the present invention, light having a wavelength of approximately 440 nm to approximately 680 nm which is included in a wavelength region of visible light is transmitted through the thin film transistor, and the voltage-current value of the thin film transistor is not changed.

Therefore, when the channel of the thin film transistor is formed of a metal oxide semiconductor like the liquid crystal display according to an exemplary embodiment of the present invention, no leakage current is created by light having a visible light wave length so that the performance of the thin film transistor is not changed.

Therefore, even when the region corresponding to the thin film transistor is not blocked by the light blocking member 220, the performance of the thin film transistor is not decreased. Further, light can pass through the transparent metal oxide semiconductor so that the aperture ratio of the liquid crystal display can be increased.

Figure 13:
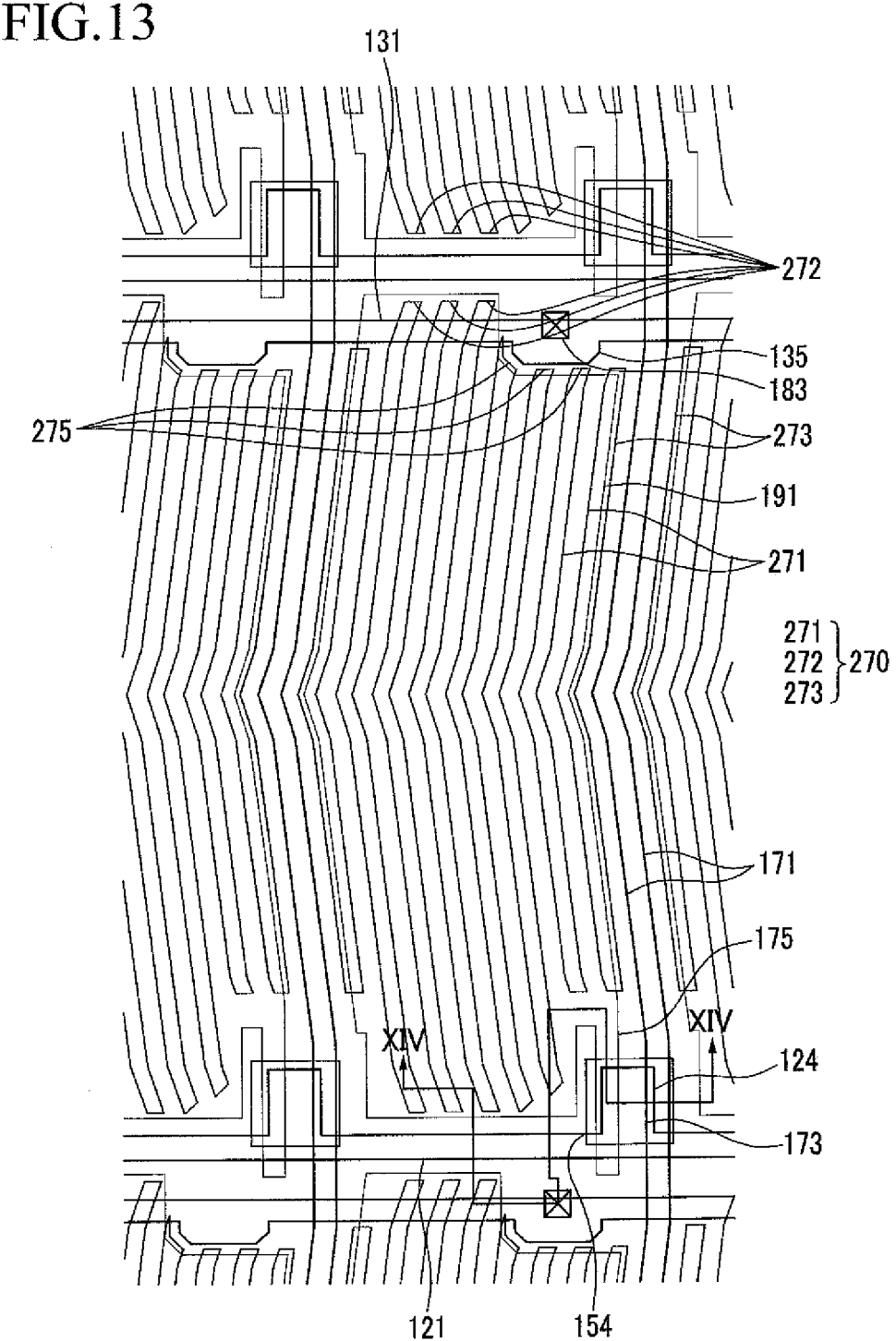
FIG. 13 is a layout view illustrating a liquid crystal display according to an exemplary embodiment of the present invention.
Figure 14:
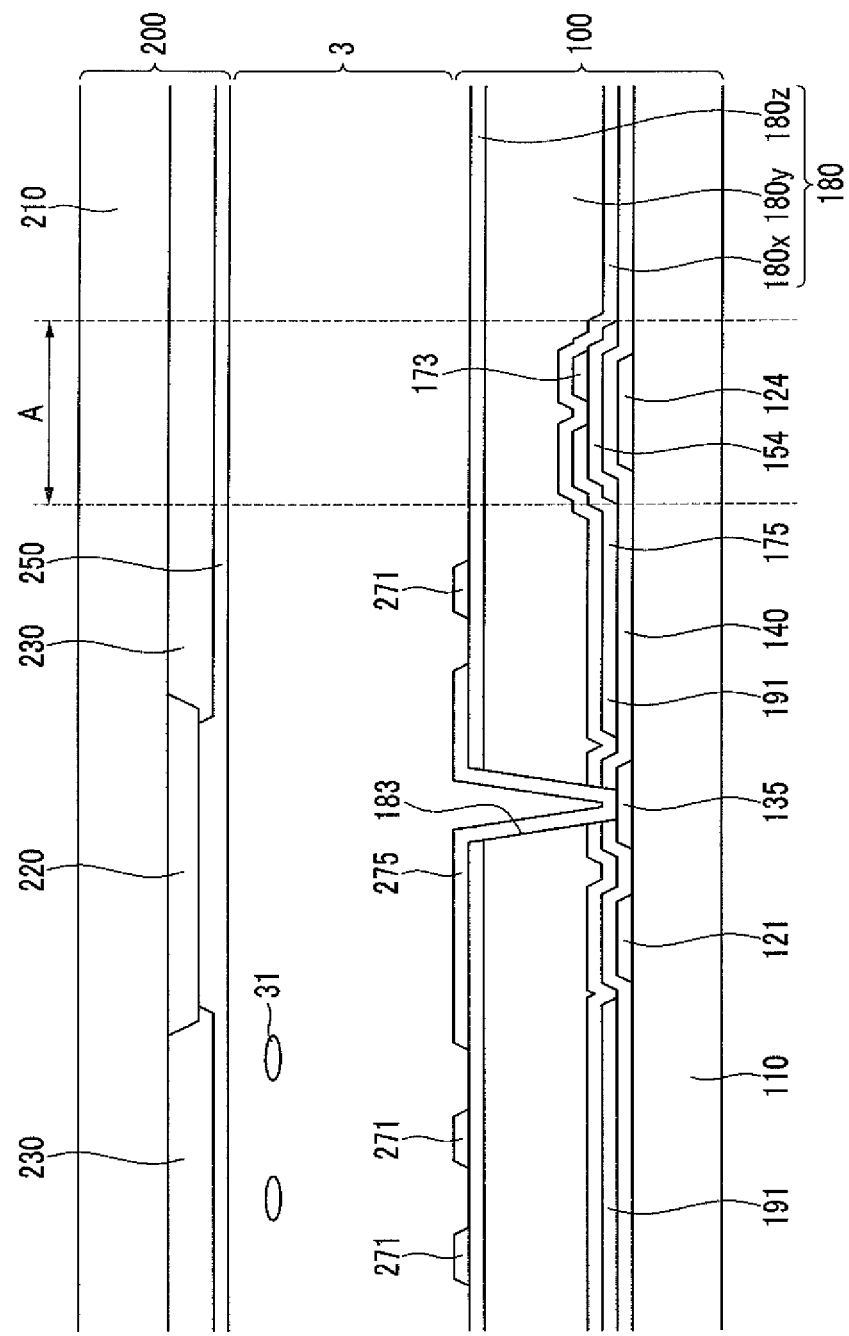
FIG. 14 is a cross-sectional view taken along line XIV-XIV of FIG. 13.

Referring to FIG. 13 and FIG. 14, a liquid crystal display according to an exemplary embodiment of the present invention is described.

The liquid crystal display is similar to the liquid crystal display described in connection with FIG. 1 and FIG. 2.

The liquid crystal display includes a lower panel 100 and an upper panel 200 which face each other. A liquid crystal layer 3 is disposed between the lower and upper panels 100 and 200.

The lower panel 100 includes gate conductors including a gate line 121 and a reference voltage line 131 formed on a first insulation substrate 110, a gate insulating layer 140 formed on the gate conductors 121 and 131, a semiconductor 154 that is disposed on the gate insulating layer 140 and formed of a metal oxide semiconductor, for example, IGZO (In—Ga—Zn—O), data conductors 171 and 175 and a pixel electrode 191 formed on the gate insulating layer 140 and the semiconductor 154, passivation layers 180 formed on the data conductors 171 and 175, the exposed semiconductor 154, and the pixel electrode 191, and a reference electrode 270 that is formed on the passivation layers 180 and connected to an extension portion 135 of the reference voltage line 131 through a contact hole 183.

The upper panel 200 includes a light blocking member 220 formed on a second insulation substrate 210. The light blocking member 220 is not formed in a region A corresponding to the thin film transistor. Thus, light penetrates a portion of the semiconductor 154 forming a channel of the thin film transistor that is not blocked by an opaque gate electrode 124, the source electrode 173, and the drain electrode 175. Therefore, the aperture ratio of the liquid crystal display is increased. A color filter 230 is formed on the light blocking member 220 and the second insulation substrate 210. According to an embodiment, when the second passivation layer 180y of the lower panel 100 includes a color filter, the color filter 230 may be omitted. An overcoat 250 may be formed on the light blocking member 220 and the color filter 230.

However, different from the liquid crystal display described in connection with FIG. 1 and FIG. 2, the data conductors 171 and 175 according to the present exemplary embodiment are formed of the same layer as the pixel electrode 191. According to an embodiment, the data conductors 171 and 175 and the pixel electrode 191 may be simultaneously formed of the same transparent metal layer. Therefore, the process of manufacturing the liquid crystal display can be simplified, and the aperture ratio of the liquid crystal display can be further increased.

In the liquid crystal display according to an exemplary embodiment of the present invention forms, a channel of the thin film transistor includes a transparent metal oxide semiconductor layer so that light passes through the gate electrode 124 and the semiconductor layer 154 that is not covered with a data metal layer. Therefore, the aperture ratio of the liquid crystal display can be increased.

The pixel electrode 191 according to an exemplary embodiment of the present invention is disposed between the gate insulating layer 140 and the passivation layers 180 and covers a portion of the drain electrode 175 and is physically and electrically connected to the drain electrode 175 through a direct connection. Therefore, the aperture ratio is increased as compared with the aperture ratio of a conventional liquid crystal display in which the pixel electrode 191 is connected to the drain electrode 175 through a contact hole.

Further, the liquid crystal display according to an exemplary embodiment of the present invention includes a source electrode 173 disposed on the same line as the data line 171 and a drain electrode 175 extending in parallel with a portion of the data line 171. Therefore, a width of the thin film transistor can be increased without an increase in an area occupied by the data conductors, resulting in an increase in the aperture ratio of the liquid crystal display.

In the liquid crystal display according to the present embodiment, the data conductors 171 and 175 and the pixel electrode 191 may be simultaneously formed of the same transparent metal layer. Therefore, the process of manufacturing the liquid crystal display is simplified and the aperture ratio of the liquid crystal display is further increased.

Referring to FIG. 15 to FIG. 21 together with FIG. 13 and FIG. 14, a method of manufacturing a liquid crystal display according to an exemplary embodiment of the present invention is described.

Figure 16:
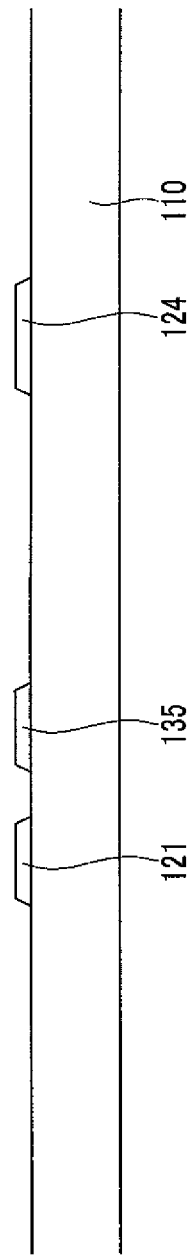
FIG. 16 is a cross-sectional view taken along line XVI-XVI of FIG. 15.
Figure 17:
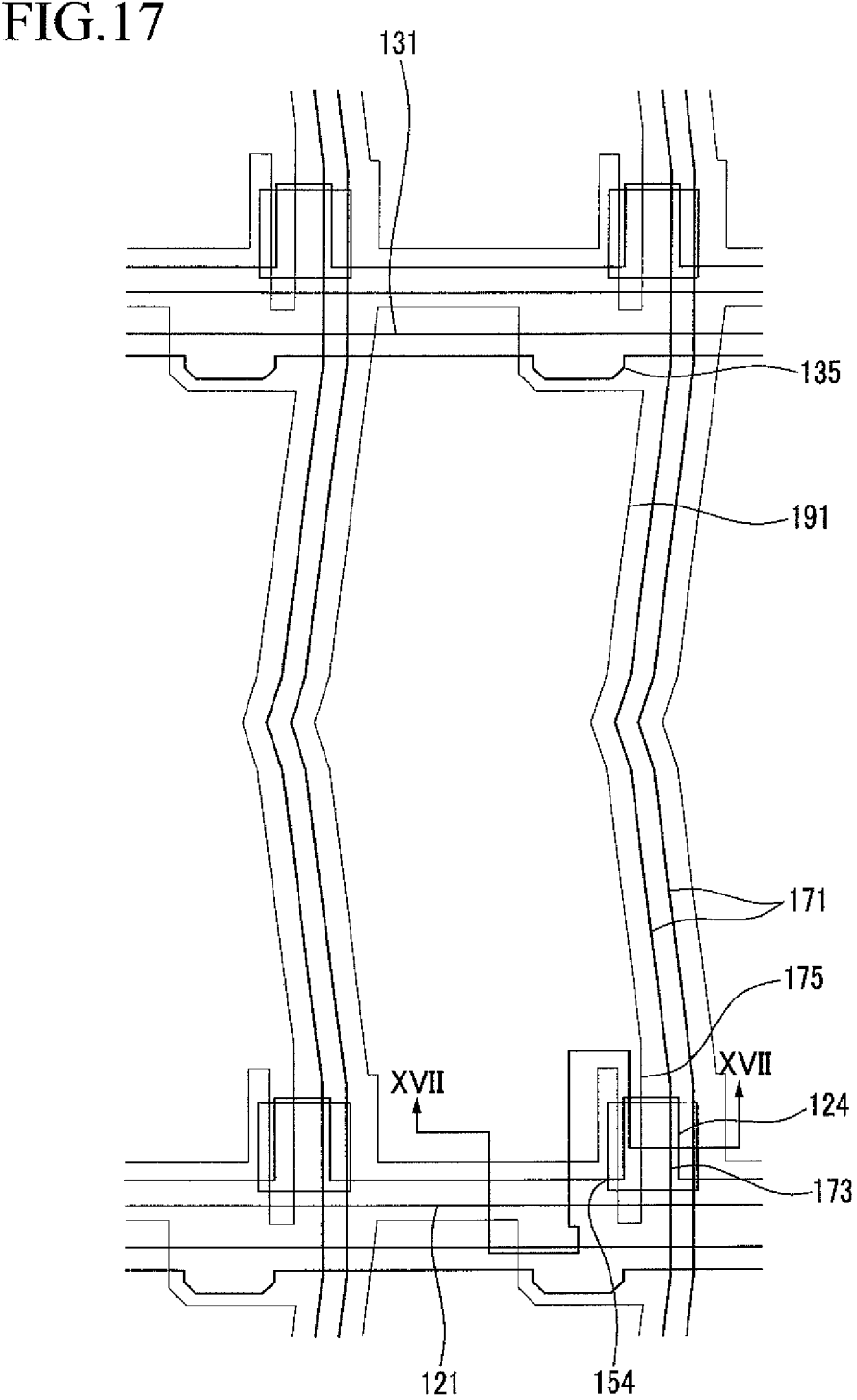
Figure 18:
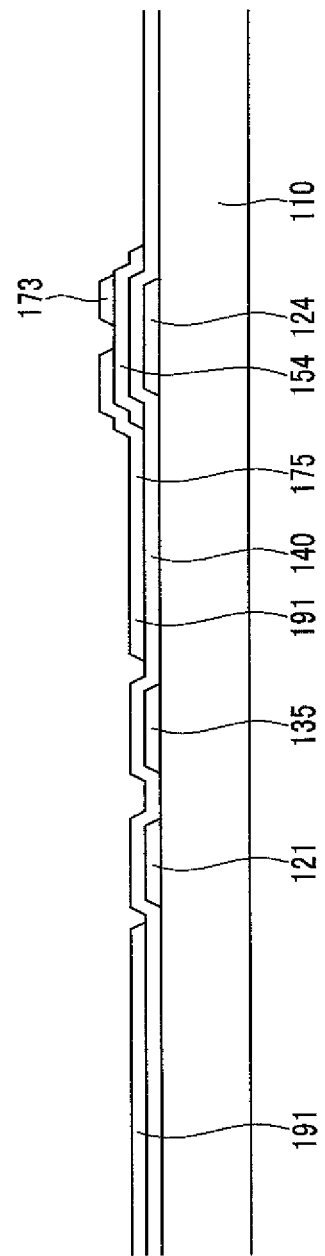
FIG. 18 is a cross-sectional view taken along line XVIII-XVIII of FIG. 17.
Figure 19:
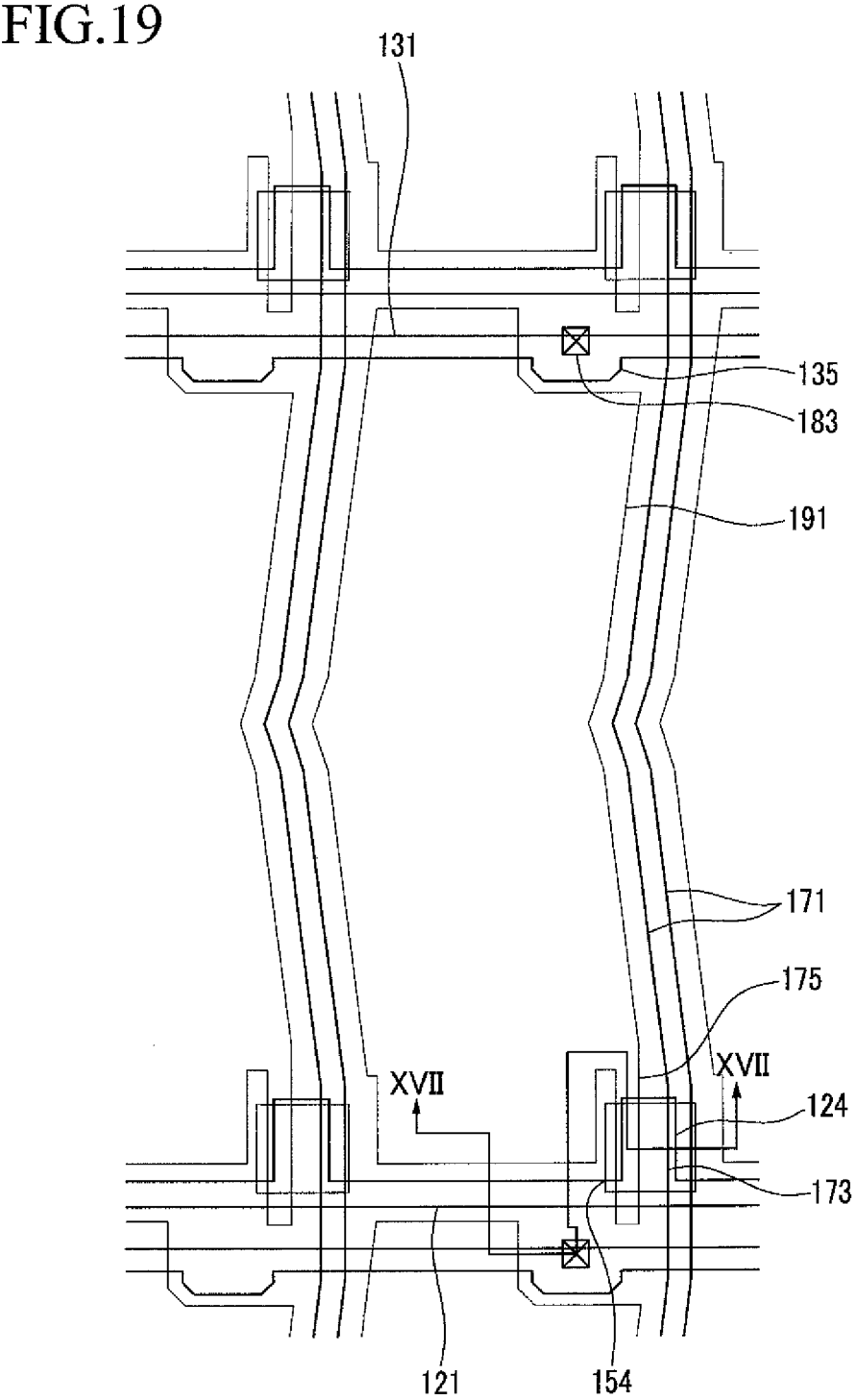
Figure 20:
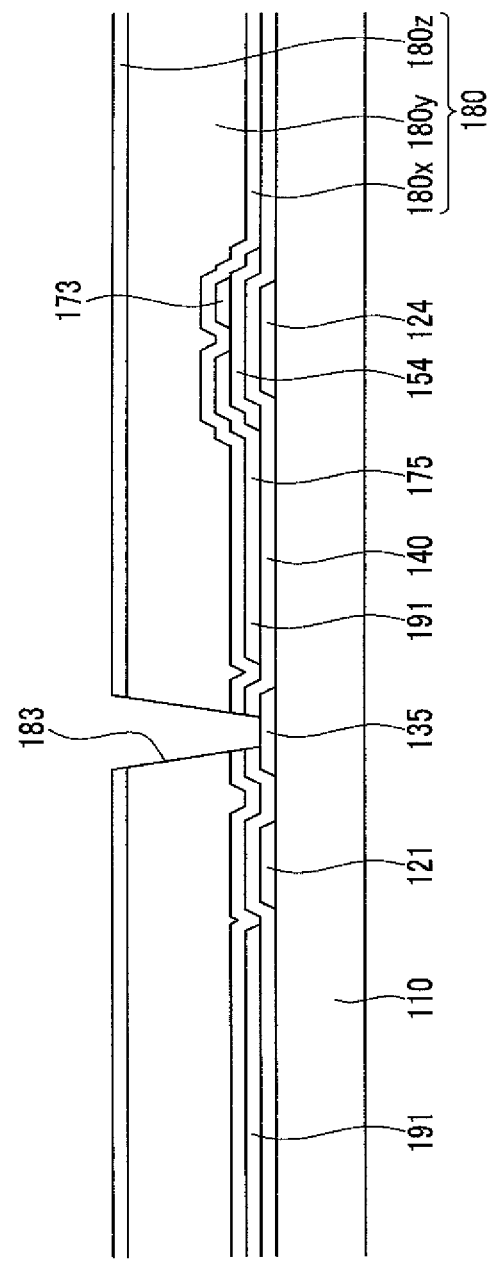
FIG. 20 is a cross-sectional view taken along line XX-XX of FIG. 19.
Figure 21:
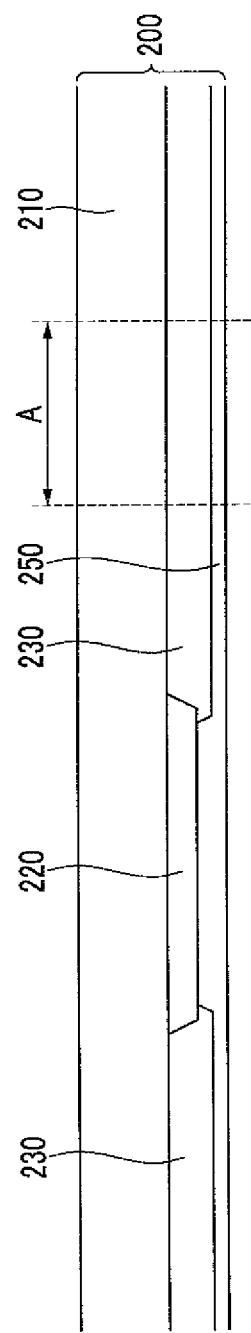
FIG. 21 is a cross-sectional view illustrating a method of manufacturing a liquid crystal display according to an exemplary embodiment of the present invention.

FIG. 15, FIG. 17, and FIG. 19 are layout views sequentially illustrating a method of manufacturing a thin film transistor display panel of a liquid crystal display according to an exemplary embodiment of the present invention, FIG. 16 is a cross-sectional view taken along line XVI-XVI of FIG. 15, FIG. 18 is a cross-sectional view taken along line XVIII-XVIII of FIG. 17, FIG. 20 is a cross-sectional view taken along line XX-XX of FIG. 19, and FIG. 21 is a cross-sectional view illustrating a method of manufacturing a liquid crystal display according to an exemplary embodiment of the present invention.

Referring to FIG. 15 and FIG. 16, gate conductors including a gate line 121 including a gate electrode 124 and a reference voltage line 131 are formed on a first insulation substrate 110.

Referring to FIG. 17 and FIG. 18, a gate insulating layer 140 is disposed on the gate conductors. A semiconductor layer 154 including a metal oxide semiconductor, data conductors including a data line 171 and a drain electrode 175, and a pixel electrode 191 that includes the same layer as the data conductor are formed on the gate insulating layer 140. The data conductors 171 and 175 and the pixel electrode 191 are formed by laminating a transparent conductive material, such as a polycrystalline, single crystalline or amorphous indium tin oxide (ITO), or indium zinc oxide (IZO), and performing photolithography on the laminated transparent conductive material.

Referring to FIG. 19 and FIG. 20, passivation layers 180 are formed on the data line 171, the drain electrode 175, the pixel electrode 191, and an exposed portion of the semiconductor 154. The passivation layers 180 may include a first passivation layer 180x formed of an organic insulating material or an inorganic insulating material and a second passivation layer 180y including an organic material. According to an embodiment, the second passivation layer 180y may be a color filter. When the second passivation layer 180y is a color filter, the passivation layers 180 include a third passivation layer 180z. The passivation layers 180 including a plurality of layers may be formed using a single mask. The mask is, for example, a halftone mask.

Next, as shown in FIG. 13 and FIG. 14, a reference electrode 270 is formed on the passivation layers 180.

As shown in FIG. 21, a light blocking member 220 that is disposed in a region on the second insulation substrate 210 corresponding to the gate conductor and the data conductor but not in a region A corresponding to the thin film transistor is formed to form the upper panel 200.

Next, the lower panel 100 and the upper panel 200 are aligned and attached to face each other, and the liquid crystal layer 3 is formed between the panels 100 and 200. Alternatively, the liquid crystal layer 3 may be formed, e.g., by dripping liquid crystal, on one of the lower panel 100 and the upper panel 200 and then the two panels 100 and 200 are aligned and attached.

Figure 22:
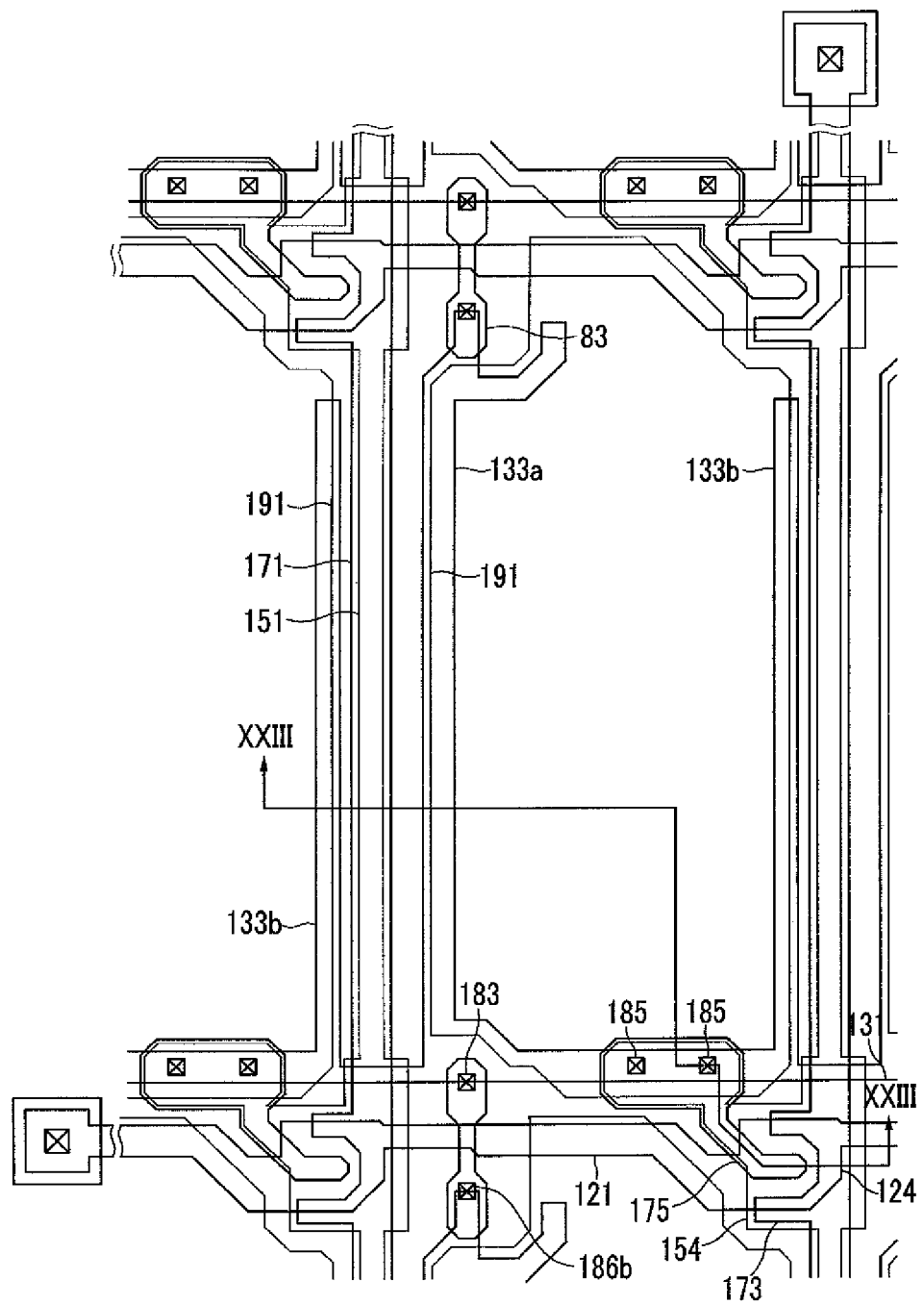
FIG. 22 is a layout view illustrating a liquid crystal display according to an exemplary embodiment of the present invention.
Figure 23:
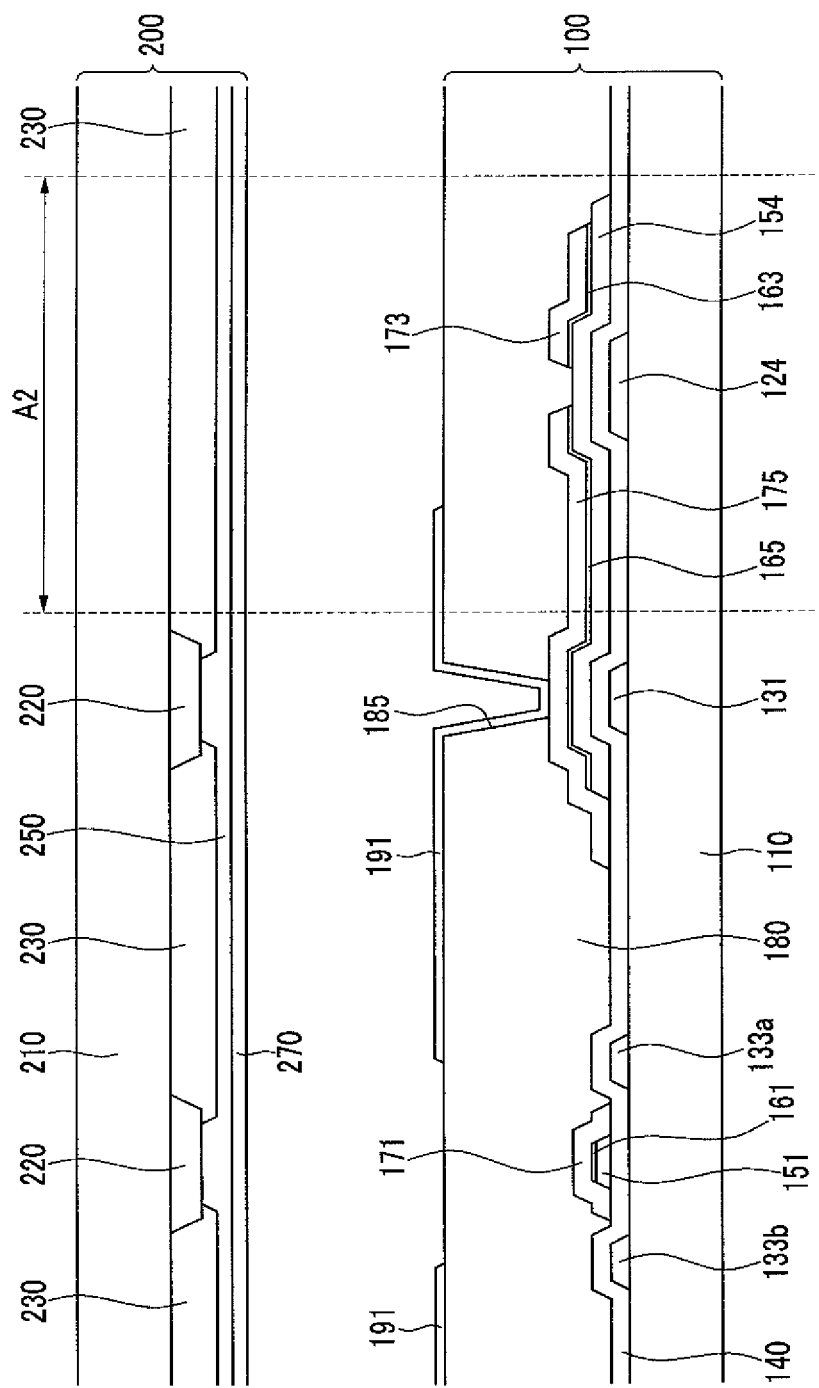
FIG. 23 is a cross-sectional view taken along line XXIII-XXIII of FIG. 22.

Referring to FIG. 22 and FIG. 23, a liquid crystal display according to an exemplary embodiment of the present invention is described.

Referring to FIG. 22 and FIG. 23, the liquid crystal display includes a lower panel 100 and an upper panel 200 which face each other. A liquid crystal layer 3 is interposed between the two panels 100 and 200.

Gate conductors including a gate line 121 and a reference voltage line 131 are formed on a first insulation substrate 110.

The gate line 121 transmits a gate signal and mainly extends in a horizontal direction. Each gate line 121 includes a plurality of gate electrodes 124 that protrude downward.

The reference voltage line 131 is applied with a predetermined voltage and includes a branch lines extending substantially parallel to the gate line 121 and a plurality pairs of first and second storage electrodes 133a and 133b that are branched from the branch line.

A gate insulating layer 140 is formed on the gate line 121 and the reference voltage line 131.

Semiconductors 151 and 154 are formed on the gate insulating layer 140. The semiconductors 151 mainly extend in a vertical direction and include a protrusion portion 154 that protrudes toward the gate electrode 124.

The semiconductors 151 and 154 include a metal oxide semiconductor.

Data conductors including a data line 171 and a drain electrode 175 are formed on the gate insulating layer 140 and the semiconductors 151 and 154. Each data line 171 includes a plurality of source electrodes 173.

One gate electrode 124, one source electrode 173, and one drain electrode 175 form one thin film transistor (TFT) together with the semiconductor 154. The channel of the thin film transistor is formed in the semiconductor 154 between the source electrode 173 and the drain electrode 175. The semiconductor 154 includes a metal oxide semiconductor layer.

A first passivation layer 180x is formed on the data line 171, the drain electrode 175, and the exposed portion of the semiconductor 154.

A first contact hole 185 that exposes the drain electrode 175 is formed in the passivation layers 180. A pixel electrode 191 is formed on the passivation layers 180. The pixel electrode 191 may be formed of a transparent conductive material, such as ITO or IZO. The pixel electrode 191 is physically and electrically connected to the drain electrode 175 through the first contact hole 185, and a data voltage is applied to the pixel electrode 191 from the drain electrode 175.

A light blocking member 220 is formed on a second insulation substrate 210. In the liquid crystal display according to an exemplary embodiment of the present invention, the channel of the thin film transistor is formed of a semiconductor 154 including a metal oxide semiconductor layer so that no leakage current of the thin film transistor is caused by light. Accordingly, the light blocking member 220 is not formed in a region A corresponding to the thin film transistor. Thus, light penetrates a portion of the semiconductor 154 forming the channel of the thin film transistor that is not blocked by the opaque gate electrode 124, the source electrode 173, and the drain electrode 175. Therefore, the aperture ratio of the liquid crystal display is increased.

A plurality of color filters 230 are formed on the second insulation substrate 210 and a portion of the light blocking member 220. Most of the color filters 230 are present in a region enclosed by the light blocking member 220.

An overcoat 250 is formed on the color filters 230 and planarizes the color filters 230. The overcoat 250 may be formed of an insulating material, such as polyimide, and prevents the color filters 230 from being exposed and provides a planarized surface.

A common electrode 270 is formed on the overcoat 250. The common electrode 270 is formed of a transparent conductor, such as ITO or IZO.

The liquid crystal layer 3 includes a nematic liquid crystal material having a positive dielectric anisotropy. The liquid crystal molecules of the liquid crystal layer 3 are aligned so that a major axis direction is parallel to the panels 100 and 200. Further, an alignment direction of the liquid crystal molecules is spirally twisted at 90° from a rubbing direction of the alignment layer of the lower panel 100 to the upper panel 200.

The pixel electrode 191 to which the data voltage is applied and the common electrode 270 generate an electric field so that the liquid crystal molecules of the liquid crystal layer 3 disposed on the two electrodes 191 and 270 rotate in a direction parallel to the direction of the electric field. The polarization of light that passes through the liquid crystal layer is changed depending on the rotation direction of the liquid crystal molecules determined as described above.

The liquid crystal display according to an exemplary embodiment of the present invention forms a channel of the thin film transistor with a transparent metal oxide semiconductor layer so that light penetrates the gate electrode 124 and the semiconductor layer 154 that is not covered with a data metal layer. Therefore, the aperture ratio of the liquid crystal display can be increased.

While the embodiments of the invention have been described, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a first substrate;
    a gate electrode formed on the first substrate;
    a gate insulating layer formed on the gate electrode;
    a semiconductor formed on the gate insulating layer;
    a source electrode and a drain electrode formed on the semiconductor;
    a second substrate that faces the first substrate; and
    a light blocking member formed on the second substrate,
    wherein the semiconductor includes a metal oxide semiconductor, and the light blocking member is not formed in a region corresponding to at least a portion of the semiconductor.
2. The liquid crystal display of claim 1, wherein a width of the gate electrode is smaller than a width of the semiconductor, and wherein the source electrode and the drain electrode extend parallel to each other.
3. The liquid crystal display of claim 2, further comprising a pixel electrode formed directly on a portion of the drain electrode.
4. The liquid crystal display of claim 3, further comprising:
    a passivation layer formed on the pixel electrode; and
    a reference electrode formed on the passivation layer.
5. The liquid crystal display of claim 4, wherein the passivation layer includes a color filter.
6. The liquid crystal display of claim 3, further comprising a common electrode disposed on the second substrate.
7. The liquid crystal display of claim 6, further comprising a color filter disposed on the second substrate.
8. The liquid crystal display of claim 2, further comprising a pixel electrode formed from the same layer as the drain electrode.
9. The liquid crystal display of claim 8, further comprising:
    a passivation layer formed on the pixel electrode; and
    a reference electrode formed on the passivation layer.
10. The liquid crystal display of claim 9, wherein the passivation layer includes a color filter.
11. The liquid crystal display of claim 8, further comprising a common electrode disposed on the second substrate.
12. The liquid crystal display of claim 11, further comprising a color filter disposed on the second substrate.
13. The liquid crystal display of claim 1, further comprising a pixel electrode formed directly on a portion of the drain electrode.
14. The liquid crystal display of claim 13, further comprising:
    a passivation layer formed on the pixel electrode; and
    a reference electrode formed on the passivation layer.
15. The liquid crystal display of claim 14, wherein the passivation layer includes a color filter.
16. The liquid crystal display of claim 13, further comprising a common electrode disposed on the second substrate.
17. The liquid crystal display of claim 16, further comprising a color filter disposed on the second substrate.
18. The liquid crystal display of claim 1, further comprising a pixel electrode formed from the same layer as the drain electrode.
19. The liquid crystal display of claim 18, further comprising:
    a passivation layer disposed on the pixel electrode; and
    a reference electrode disposed on the passivation layer.
20. The liquid crystal display of claim 19, wherein the passivation layer includes a color filter.
21. The liquid crystal display of claim 18, further comprising a common electrode disposed on the second substrate.
22. The liquid crystal display of claim 21, further comprising a color filter disposed on the second substrate.
23. A method of manufacturing a liquid crystal display, the method comprising:
    forming a gate electrode on a first substrate;
    forming a gate insulating layer on the gate electrode;
    forming a semiconductor including a metal oxide semiconductor on the gate insulating layer;
    forming a source electrode and a drain electrode on the semiconductor; and
    forming a light blocking member on a second substrate, the second substrate facing the first substrate,
    wherein the light blocking member is not formed in a region corresponding to at least a portion of the semiconductor.
24. The method of claim 23, wherein a width of the gate electrode is smaller than a width of the semiconductor.
25. The method of claim 23, further comprising forming a pixel electrode directly on a portion of the drain electrode.
26. The method of claim 25, further comprising:
    forming a passivation layer on the pixel electrode; and
    forming a reference electrode on the passivation layer.
27. The method of claim 26, wherein the passivation layer includes a color filter.
28. The method of claim 25, further comprising forming a common electrode on the second substrate.
29. The method of claim 28, further comprising forming a color filter on the second substrate.
30. The method of claim 23, further comprising forming a pixel electrode from the same layer as the drain electrode.

* * * * *